Feb. 15, 1955

B. TREVOR 2,702,343

PIEZOELECTRIC CRYSTAL FILTER FOR EXALTED CARRIER AND DISCRIMINATOR CIRCUITS

Filed Jan. 6, 1949

INVENTOR
BERTRAM TREVOR
BY H. L. Newton
ATTORNEY

United States Patent Office 2,702,343

Patented Feb. 15, 1955

2,702,343

PIEZOELECTRIC CRYSTAL FILTER FOR EXALTED CARRIER AND DISCRIMINATOR CIRCUITS

Bertram Trevor, Riverhead, N. Y., assignor to Radio Corporation of America, a corporation of Delaware Application January 6, 1949, Serial No. 69,418

The terminal 15 years of the term of the patent has been disclaimed

4 Claims. (Cl. 250—20)

Figures 1, 2:
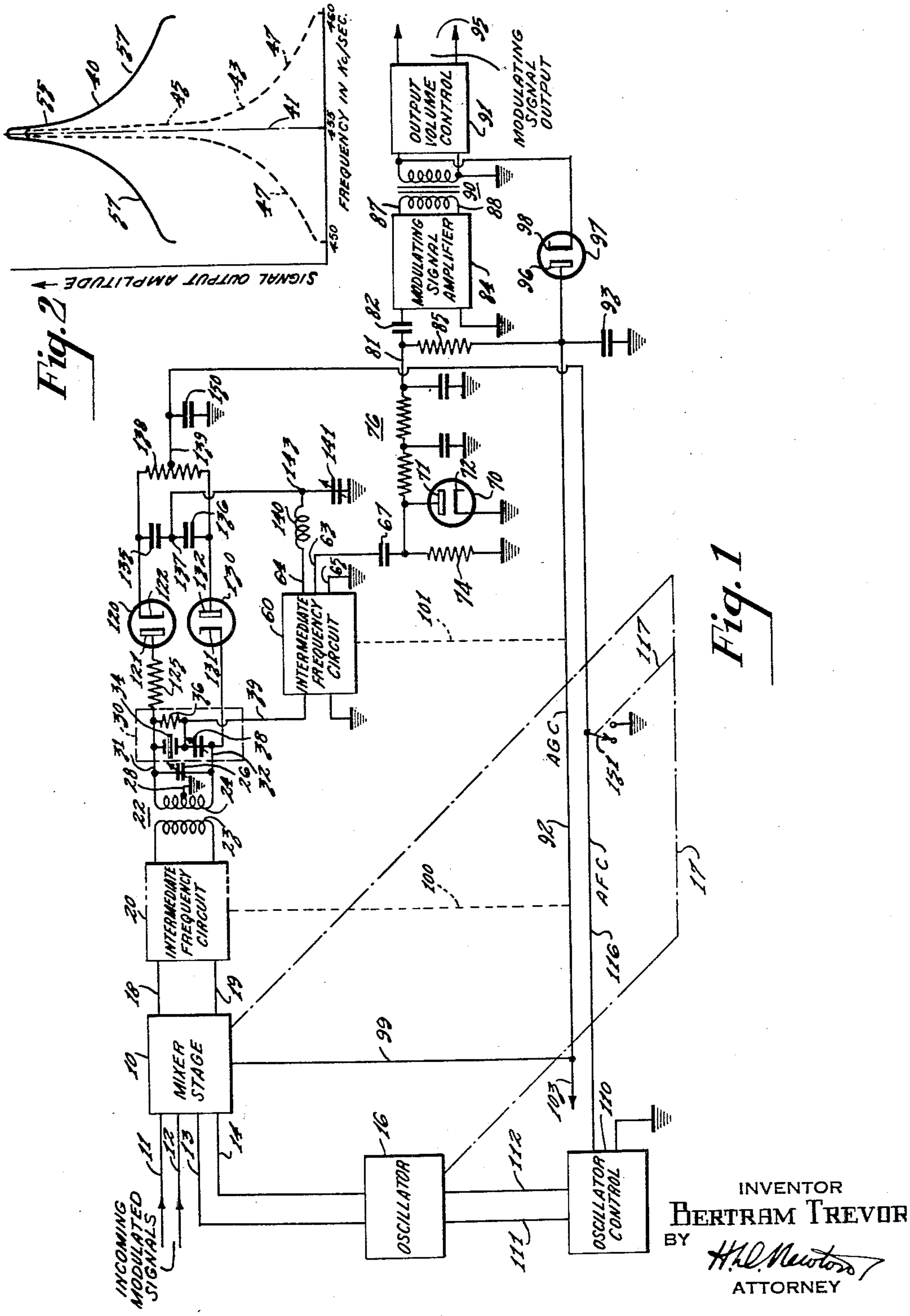

This invention relates to exalted carrier receivers, particularly to novel circuit arrangements for such receivers.

It is known that under certain conditions of radio signal reception, signal waves radiated by a transmitter and traveling in different directions are simultaneously received in a single receiver with comparable intensity levels although they come by different paths. These paths usually have different lengths, as for example when one wave is the so-called ground wave following along the surface of the earth, and a second or so-called sky wave is received by reflection of radiations from the upper levels of the earth's atmosphere. These two waves accordingly arrive at the receiver relatively displaced in phase. Where the phase displacement is 180 degrees, the positive swings of one wave arrive just when the negative swings of the other arrive, and both waves cancel out, if of the same intensity. Since the phase displacement depends upon the ratio of the wave length and the difference in path length, only waves of definite lengths, or frequencies, are usually canceled out at any one time.

The above type of interference is quite common when attempts are made to receive modulated radio waves radiated by a distant transmitter. Such waves are conventionally made up of a group of elemental waves each of a different frenquency, and all lying in a relatively narrow frequency range or channel. At about the mid frequency of the channel, there is a relatively intense carrier wave, the remaining or side-band waves being of lesser amplitude and formed at the transmitter by modulating the carrier in accordance with the signals desired to be transmitted. The cancellation of any one frequency does not have much effect on the intelligibility of the received signals, except when the carrier wave is the one cancelled. When this happens, the conventional receiver cannot properly demodulate the signals to recover the intelligence.

It has been previously proposed to use receivers having special circuits for raising the relative level of the carrier with respect to the side bands, so that fading of the carrier is less likely to cause trouble. In fact, cancellation of the carrier is seldom perfect or complete but nearly always leaves some residual wave amplitude. By taking advantage of such residuum in this manner, signal reception is considerably improved. Prior so-called exalted carrier systems have, however, been quite complicated and expensive.

The present invention includes among its objects, the provision of a novel, relatively simple exalted carrier system.

Further objects of the invention include the provision of novel control and compensating circuits for such systems.

The above as well as other objects of the invention will be more clearly understood by the following description of exemplifications thereof, reference being made to the accompanying drawings wherein:

Figure 1 is a circuit diagram, with parts in block form, of the essential elements of an exalted carrier system embodying the invention; and Figure 2 is a curve diagram illustrating the carrier exalting operation of the system.

Referring to Figure 1, a heterodyne type of signal receiving system is shown. A heterodyne mixer or converter stage 10 has input connections 11, 12 for receiving the desired radio signals. Another pair of input connections 13, 14 supply the mixer stage with a mixer wave generated at oscillator circuit 16. One connector of each pair of input connections is a signal return lead and may be a common connection such as a ground return path. Output leads 18, 19 deliver the desired heterodyne or beat signals which may be passed through an intermediate frequency circuit indicated at 20 and brought to a carrier exalting circuit shown in the dash-line box 30. For use with radio receivers the incoming signals supplied by leads 11, 12 may be selected from a wide range of signal frequencies, and the oscillator 16 adjusted to change the frequency of mixer waves that it supplies in accordance with changes in the desired incoming signal frequencies so that the heterodyne or beat signals passing through intermediate frequency circuit 20 fall within a definite and fixed intermediate frequency channel. Dot-dash line 17 indicates a suitable linkage between an input tuning circuit and an oscillator tuning circuit to simplify their simultaneous tuning. The details of heterodyne frequency conversion circuits are well known in the art and are not shown in the drawing. They can be found in any radio text such as the RCA Receiving Tube Manual, Technical Series RC–14, Copyright 1940 by RCA Manufacturing Co., Inc., pages 32 to 34 inclusive.

The carrier exalting circuit 30 has input leads 31, 32 coupled to receive input signals through transformer 22 having a primary winding 23 and a secondary winding 24. Either or both of the windings may be tuned to the intermediate frequency pass channel by a parallel connected capacitance, as shown by the capacitor 26 tuning the secondary 24. A grounded center tap 28 for the secondary winding 24 provides a reference connection with respect to which each of the signals developed at the ends of the secondary winding is oppositely phased. In other words alternating signal swings developed at one terminal of secondary 24 are always positive with respect to its center tap when signal swings at its opposite terminal are negative with respect to the same center tap. The carrier-exalting circuit 30 consists of a highly selective signal-passing element shown as piezoelectric crystal 34, impedance 36 shunting the crystal, and a neutralizing capacitor 38. The crystal 34 and its shunting impedance 36 are connected in series between one of the input leads 31 and an exalted carrier output lead 39. The capacitor 38 is connected between the other input lead 32 and the output lead 39 to balance out any undesired effects of inherent capacitance in the circuit combination of crystal 34 and shunting impedance 36. Thus where the shunting impedance is a resistor, as shown, the significant amount of capacitance across the terminals of crystals 34 may adversely effect the sharpness of its selectivity. By supplying to output lead 39 signals opposite in phase to that transmitted to the crystal by reason of its capacitance, the crystal circuit will pass signals as if it had no undesired capacitance and its pass characteristics will be maintained at the desired selectivity. By making the capacitor 38 variable it can be readily adjusted to the desired neutralizing value.

Figure 2 illustrates by the curve 40 the operation of the carrier-exalting circuit. The pass characteristics of the crystal are adjusted so as to peak very sharply at the center of the intermediate frequency channel indicated at 41, and generally about 455 kilocycles per second. The sharpness of the crystal selectivity is represented by the dash line curve 43 having an extremely steep spike portion 45 sloping away on both sides to provide very broad skirts 47, 47. Such selectivity by itself is not satisfactory. The center frequencies, corresponding to the carrier of the received signal, are passed at a level so much higher than the side bands, that there would be too much side band attenuation. Furthermore the relatively rapid drop in output as the side band frequency deviates from the carrier frequency would greatly distort the amplitudes of modulation signals having different frequencies.

According to the invention, a signal-conductive circuit directly by-passes the sharply selective element 34. This has the effect of superimposing upon the selectivity curve 43, an overall pass which is substantially uniform. As a result, the pass characteristics of the combination may be represented by curve 40 which generally follows curve 43 but is displaced upwardly by an amount corresponding to the degree of shunting. The central spike 45 of curve 43 is reproduced at 55 somewhat diminished in sharpness.

This is due to the reduced effect of the by-pass at those frequencies where the crystal offers very little impedance. However, the sloping sides 57 of curve 40 reach the limits of the intermediate frequency channel, represented by 450 and 460 kilocycles per second, at a much higher level.

The output signals appearing at lead 39 with respect to ground accordingly have their modulation side bands attenuated with respect to the carrier. This has the effect of lowering the degree of modulation, permitting a considerable loss of carrier level without introducing any over-modulation difficulties. These exalted carrier signals are passed through intermediate frequency circuit 60 having two output circuits provided by output leads 63, 64 and common ground 65. Lead 63 connects one of the output circuits through coupling capacitor 67 to the anode 71 of a rectifier diode 70, the cathode 72 of which is grounded. Rectifier load resistor 74 is connected across the rectifier electrodes. A filter network 76 connects the diode plate 71 to a signal output lead 81 which is coupled by blocking capacitor 82 to one input terminal of an amplifier circuit 84. A common ground connection may be used as the other input terminal for this amplifier. Output leads 87, 88 from this amplifier are connected as by coupling transformer 90 to the desired modulating signal output elements indicated at 95 which may be a signal reproducer such as a loud-speaker. If desired, an output volume control 91 may be inserted in the output circuit.

An automatic gain control (AGC) arrangement is included in Figure 1. An automatic grain control lead 92 is connected through impedance 85 to filter output lead 81, is directly connected to the anode 96 of a rectifier diode 97, and is by-passed to ground through capacitor 93. The cathode 98 of rectifier 97 is connected to one end of the secondary of output transformer 90, the other terminal of the secondary being returned to ground. AGC lead 92 is used to control the degree of amplification effected in any of the amplification stages such as mixer stage 10, the control connection being shown at 99. Where either or both of the intermediate frequency circuits 20, 60 include amplification circuits, these may be also controlled as indicated by the dash line connections 100, 101. The specific type of amplification stages and amplification control circuits are incorporated in these stages are not described but are well known in the art. See for example pages 29 and 30 of the RCA Receiving Tube Manual cited above. As is also well known, AGC lead 92 may be utilized for additional purposes such as controlling the gain of stages prior to mixer stage 10 and/or to operate tuning indicators. These other connections are indicated by the arrow 103.

One of the important objects of automatic gain control systems is the reduction of manual volume control changes that would otherwise be required as a result of variations in the incoming signal strength. Conventional AGC systems, which merely derive a gain control voltage corresponding to the carrier level, are not suitable during selective carrier fading conditions. The side band level remains quite high during such fading and the AGC increases the amplification as though all the incoming signal frequencies are fading. Not only does this result in undue increases in signal output level, but it emphasizes overmodulation distortion and renders it much more objectionable.

The present invention avoids this difficulty by maintaining the AGC voltage at the original carrier responsive levels during carrier fading by the addition of voltage from the demodulating signal level. As shown in Figure 1, the impedance 85 and by-pass capacitor 93 supply AGC lead 92 with a rectified negative voltage corresponding to the carrier level. Diode 97 has its cathode supplied with demodulating signals having a maximum or peak level approximating, or slightly lower than that supplied to lead 92 in the absence of fading. When the carrier fades, a decrease takes place in the negative voltage supplied by impedance 85. Accordingly demodulating signal peaks begin to render cathode 98 more negative than anode 96, causing an increase in negative voltage at lead 92 offsetting somewhat the decrease due to carrier fading. By suitable choice of time constant in the combination of impedance 85 and capacitor 93, even intermittent signal peaks will be able to keep the capacitor from discharging appreciably between the peaks. The overall effect is to provide a highly effective AGC system which greatly enhances the quality of reception. Output volume control elements such as a conventional manually operable resistance potentiometer, or a variable tap for the secondary of transformer 90, is connected to a portion of the circuit following the modulating-signal-responsive lead to diode 97 in order to have the AGC operation independent of the individually desired volume control setting.

Because of the sharpness with which the exalting circuit selectively passes the carrier it is necessary to provide controls to assure that the carrier frequency does not appreciably deviate from the predetermined value. This is especially important where the output frequency of oscillator 16 is likely to suffer a significant amount of drift during operation. For this purpose an automatic frequency control (AFC) network including oscillator control circuit 110 connected to oscillator 16 as by leads 111, 112 and operating in response to signals appearing on automatic frequency control conductor 116. Any suitable type of oscillator control may be used as for example the arrangement shown in Patent No. 2,443,746, dated June 22, 1948. For operating such controls the conductor 116 requires signals with respect to ground that vary in magnitude in accordance with the amount and direction of shifts of the oscillation output from the desired frequency.

As shown in Fig. 1 the automatic frequency control system includes a pair of diodes 120, 130. The oppositely phased signals at leads 31, 32 are supplied respectively to the anode 121 of diode 120 and the cathode 131 of diode 130. It may be advisable to insert an impedance 125 in one of the diode supply leads if the grounded tap 28 of the supply secondary is not accurately centered. Between the cathode 122 of diode 120 and the anode 132 of diode 130 are connected a pair of capacitors 135, 136 in series, as well as an impedance 138 having a center tap 139. Tap 139 is by-passed to ground through by-passing capacitor 150, and is connected to control lead 116.

The second output lead 64 of intermediate frequency circuit 60, supplies to the junction 137 between capacitors 135, 136, waves which are normally in quadrature, that is 90 degrees out of phase, with respect to each of the waves at leads 31, 32. A 90 degree phase shifting circuit, shown as an inductance 140 and a series capacitance 141, is connected across the output between leads 64 and 65, and the junction 143 between these series elements is connected to junction 137. By tuning the series circuit 140, 141 to the selective frequency of crystal 34, the signals appearing across capacitance 141 or across inductance 140 will have the desired quadrature.

When the carrier signals at 31, 32 have a frequency corresponding to the peak response of crystal 34, there will be impressed across the respective diodes 120, 130, the respective oppositely phased signals from secondary 24, accompanied by the quadrature signals applied at 137. The symmetricity of the circuit will cause the resultant of the combined signals impressed across each diode to be of equal magnitude. Accordingly diode 120 will develop at its cathode 122 a positive voltage with respect to its anode, and the anode 132 of diode 130 will become negative with respect to its cathode 131 by the same amount. By reason of the symmetry, one end of impedance 138 will become positive with respect to grounded center tap 28 by the same amount that the other end becomes negative with respect to it. The center tap 139 of impedance 138 will therefore be at the same D.-C. potential as the tap 28. Accordingly no voltage appears at control lead 116.

The crystal itself, in the construction of Figure 1, forms part of a phase shifting network together with the 90 degree phase shifting circuit 140, 141. When the carrier supplied by the leads 31, 32 is displaced in frequency from that of the selective peak of the crystal, a rapid change of phase takes place in the signals delivered to lead 39 and to junction 143. Because of this change, the signals applied to the diodes from the phase shifting network will become displaced in phase so as to be less than 90 phase degrees away from one of the signals at 31, 32, and more than 90 phase degrees away from the other. As a result, a larger resultant signal is developed across one of the diodes 120, 130 than across the other. The D.-C. potential of one end of the impedance 138 becomes further removed from ground than the other end and a D.-C. voltage with respect to ground accordingly appears at the center tap 139. When the frequency displacement at 31, 32 is in the opposite direction, the phase displacement is in the opposite direction and the D.-C. voltage at 139 becomes oppositely polarized with respect to ground. Conductor 116 applies these D.-C. discriminator voltages at 139 to the oscillator control circuit 110 and causes it to shift the oscillator output frequency in the direction that reduces the magnitude of the discriminator voltage thereby keeping the oscillator output at the desired frequency.

In some cases, the automatic frequency control (AFC) may interfere with the desired operation. Thus for example when used with signal receivers that are tunable, the AFC may cause the tuning to be set at a point close to an operational limit of the AFC system. In such event, the AFC may not function properly, as when a frequency drift calls for a control requiring the operational limit to be exceeded. For this purpose an AFC disabling means shown as a shorting switch 151 is provided to interrupt the AFC action until the tuning is completed.

According to the invention the disabling switch 151 is connected for automatic operation by the dash-double-dot linkage 117 of tuning structure 17 so that no independent manipulation of the AFC is necessary. Electrical and/or mechanical interconnecting means, such as the tuning control and switch combination described in U. S. Patent No. 2,049,809, dated August 4, 1936, may be used for this purpose.

According to a different phase of the invention the tuning mechanism 17 is of the preset type as exemplified by the well-known push-button operated radio tuners where the operation of a control, no matter how haphazard or variable, will automatically tune the system to a preset signal frequency. One example of a suitable preset tuning arrangement is described in U. S. Patent No. 2,209,959, granted August 6, 1940. When the pre-setting is properly made, accurate tuning is possible without invoking the automatic frequency control and no difficulties will be experienced. The AFC disabling means may be retained even with pre-set tuning systems, to provide for the required presetting adjustments as well as to allow tuning to signals other than those for which the system is or can be pre-set.

Another feature of the invention is the adjustment of the AFC circuit so that the capacitance of capacitor 150 and the impedance 138 provide a relatively long time constant of about 1 or 2 seconds. In other words, the development of voltage changes at 139 will be delayed because of necessity for the slow charging or discharging of the capacitor. With such an arrangement tuning of desired signals can be readily effected manually without disabling the AFC circuit, if the tuning is completed within the time required for the AFC circuit to react by more than a limited amount to the signals being sought. The tuning need not be very accurate; so long as it is safely within the AFC limits, the desired operation will follow. A tuning time about equal to the time constant has been found to be satisfactory.

An important feature of the invention is the combination of a receiver having a conventional intermediate frequency channel in the 400 to 500 kilocycle per second range with an exalting network that is sharply selective to the particular frequency in that channel that corresponds to the carrier frequency. Although the selectivity of the mechanically resonant element is not quite as sharp as is possible at lower frequencies, the exaltation of the carrier is still highly effective. Intelligible signals are reproduced with the apparatus of the invention when a conventional receiver produces nothing more than a meaningless jumble of badly distorted sounds. Relatively few components have to be added to the conventional receivers to achieve the desired results, especially for conventional receivers which already incorporate automatic frequency control.

The inherently broader selectivity of the mechanical resonance at the high frequencies of the invention will have the effect of emphasizing the low signal modulation frequencies. This can be explained by reference to the slope of the skirts 57 in curve 40 of Figure 2. The low modulation frequencies, which are the ones closest to the carrier, are transmitted more readily than the more remote, or high modulation frequencies. To compensate for such non-uniformity where it is desired to have the amplitude distribution of the modulating signal output follow more closely that of the original modulations, low frequency attenuation or de-emphasis may be utilized. For this purpose the modulating signal amplifier 84 may be arranged to include selective degenerative feedback for low frequency signals, as by incorporating a vacuum-tube amplification stage in which the return circuit of the tube's cathode is through a resistance that is capacitively by-passed for only the high signal frequencies. Alternatively a capacitive coupling linkage between stages or circuits such as is provided by the capacitor 82 may be of such low capacitance as to cut the amplitudes of the low frequency signals passed. Any other type of de-emphasis arrangement may be used, if desired.

The exalting carrier circuit element 34 is not limited to being a piezoelectric crystal as described above. Any mechanically resonant structure having a selectivity Q of about 1000 or higher, is suitable. An example of such other circuit component is the mechanically resonant signal transfer structure described in U. S. Patent No. 2,091,250, dated August 31, 1937. Shunting of the mechanical resonance is not limited to being purely resistive. Reactances may be used, either by themselves or in combination with a resistance so long as the overall pass circuit retains sufficient symmetry. One convenient way to provide a reactance shunt is by diminishing or omitting the neutralizing capacitance 38. Marrison Patent No. 1,994,658, dated March 19, 1935, shows the effect obtainable by its omission. The supply of oppositely phased waves for balancing the carrier-exalting input signals need not be from a center-tapped transformer winding but may be provided by other means, such as by taking signals from two different amplification stages an making use of the phase reversal inherently produced by the conventional amplifier.

Filter network 76 is shown as a two-section series resistance, shunt capacitance circuit to assure the adequate filtering of the exalted carrier waves from the demodulated signals. Other types of filters may also be used if desired.

The various features of the invention may be used individually without the others. Thus the novel AFC system which does not require a special transformer input is highly suited for general application.

While several exemplifications of the invention have been indicated and described above, it will be apparent to those skilled in the art that other modifications may be made without departing from the scope of the invention as set forth in the appended claims.

What is claimed is:

1. In an exalted carrier-wave receiver system for receiving modulated carrier waves, a discriminator comprising a transformer having a secondary winding with at least two terminals, means connecting an intermediate point of said secondary winding to a point of fixed reference potential, means for tuning said transformer to a predetermined frequency, a piezoelectric crystal and a first capacitor serially connected across said secondary winding, an impedance shunting said crystal, a pair of rectifiers, each having a cathode and an anode, the anode of one rectifier and the cathode of the other rectifier being connected to respective terminals of said secondary winding, a pair of capacitors serially connected between the cathode of said one rectifier and the anode of said other rectifier, a connection between the junction point of said crystal and first capacitor and the junction point of said pair of capacitors, and a 90 degree phase shifting network included in said connection.

2. The combination as defined in claim 1 wherein a resistor is connected across said pair of capacitors, and wherein a further capacitor is connected between the midpoint of said resistor and said point of fixed potential and wherein an output circuit is connected across said further capacitor.

3. The combination as defined in claim 1 wherein said connection further includes an intermediate-frequency circuit having a carrier-wave output circuit.

4. In an exalted carrier-wave receiver system for receiving amplitude-modulated carrier waves, a discriminator comprising a transformer having a secondary winding, means connecting the midpoint of said secondary winding to ground, means for tuning said secondary winding to a predetermined frequency, a piezoelectric crystal and a first capacitor serially connected across said secondary winding, a pair of rectifiers, each having a cathode and an anode, a first resistor connected between the anode of one rectifier and one terminal of said secondary winding, the cathode of the other rectifier being connected to the other terminal of said secondary winding, a second resistor connected across said crystal, a pair of capacitors serially connected between the cathode of said one rectifier and the anode of said other rectifier, a connection between the junction point of said crystal and first capacitor and the junction point of said pair of capacitors, said connection including an intermediate-frequency circuit and a 90 degrees phase shifting network, a third resistor connected across said pair of capacitors, a first direct-current output circuit connected between the midpoint of said third resistor and ground, and a second carrier-wave output circuit coupled to said intermediate frequency circuit.

References Cited in the file of this patent

UNITED STATES PATENTS

| | | |
|---|---|---|
| 2,040,221 | Tubbs | May 12, 1936 |
| 2,377,327 | Seeley | June 5, 1945 |
| 2,397,840 | Crosby | Apr. 2, 1946 |
| 2,416,795 | Crosby | Mar. 4, 1947 |
| 2,425,924 | Crosby | Aug. 19, 1947 |
| 2,467,345 | Travis | Apr. 12, 1949 |
| 2,496,063 | Mural | Jan. 31, 1950 |
| 2,496,818 | Seeley | Feb. 7, 1950 |
| 2,528,182 | Sands et al. | Oct. 31, 1950 |
| 2,561,088 | Anderson | July 17, 1951 |